(12) United States Patent
Linkert et al.

(10) Patent No.: US 8,072,880 B2
(45) Date of Patent: Dec. 6, 2011

(54) SYSTEM FOR CORRECTING ERRORS IN RADIO COMMUNICATION, RESPONSIVE TO ERROR FREQUENCY

(75) Inventors: Barry Linkert, Petersburg (CA); James Zhu, Waterloo (CA); Salim Omar, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 126 days.

(21) Appl. No.: 11/555,722

(22) Filed: Nov. 2, 2006

(65) Prior Publication Data

US 2007/0105546 A1    May 10, 2007

(30) Foreign Application Priority Data

Nov. 4, 2005   (EP) .................................... 05024075

(51) Int. Cl.
*H04J 3/14* (2006.01)
(52) U.S. Cl. ........................................ 370/229; 455/423
(58) Field of Classification Search .................. 455/186, 455/423
See application file for complete search history.

(56) References Cited

U.S. PATENT DOCUMENTS

| | | | |
|---|---|---|---|
| 5,445,263 | A | 8/1995 | Mohlenkamp et al. |
| 5,607,344 | A | 3/1997 | Endres |
| 5,828,224 | A | 10/1998 | Maruyama |
| 6,097,732 | A | 8/2000 | Jung |
| 6,168,221 | B1 | 1/2001 | Carruth et al. |
| 6,199,070 | B1 * | 3/2001 | Polo-Wood et al. .......... 707/202 |
| 6,253,211 | B1 | 6/2001 | Gillies et al. |
| 6,279,037 | B1 | 8/2001 | Tams et al. |
| 6,279,885 | B1 | 8/2001 | Leon, Jr. |
| 6,516,424 | B2 * | 2/2003 | Satomi et al. ...................... 714/4 |
| 7,127,507 | B1 * | 10/2006 | Clark et al. .................... 709/224 |

(Continued)

FOREIGN PATENT DOCUMENTS

DE        20206846        9/2003

(Continued)

OTHER PUBLICATIONS

European Patent Application No. 05 024 075.3 European Examination Report of dated Sep. 29, 2010.

(Continued)

*Primary Examiner* — Dwayne Bost
*Assistant Examiner* — Joseph Dean, Jr.
(74) *Attorney, Agent, or Firm* — T. Andrew Currier; Stephen J. Perry; Perry + Currier Inc.

(57) ABSTRACT

Errors of e.g database synchrony between a radio-connected mobile-station and a server can be especially troublesome if continued and repeated, and can quickly deplete resources in the mobile-station. This problem is addressed by keeping an error-event-count in the server; when the count exceeds a threshold, the server signals the mobile to immediately transmit the recent-activity-log in the mobile, i.e the log in the mobile in which are recorded the detailed elements relating to assembling and transmitting the data packet in which the error was detected. Using the information in the recent-activity-log, the server can institute de-bugging strategies, etc, to correct the problem. The threshold is in two stages; above the initial threshold, the mobile-station is signalled to increase the level of detail as recorded in the recent-activity-logs (if the mobile is able to do so), and the actual transmission of the log only takes place above the main threshold.

17 Claims, 2 Drawing Sheets

U.S. PATENT DOCUMENTS

| | | | |
|---|---|---|---|
| 7,209,963 B2 * | 4/2007 | Burton et al. | 709/223 |
| 2001/0040462 A1 | 11/2001 | Haseyama | |
| 2002/0038796 A1 | 4/2002 | Leon, Jr. | |
| 2002/0184568 A1 | 12/2002 | Kurrasch | |
| 2002/0194319 A1 | 12/2002 | Ritche | |
| 2002/0194320 A1 | 12/2002 | Collins et al. | |
| 2003/0005107 A1 * | 1/2003 | Dulberg et al. | 709/223 |
| 2003/0012138 A1 | 1/2003 | Abdelilah et al. | |
| 2003/0140284 A1 | 7/2003 | Dettinger et al. | |
| 2003/0237035 A1 | 12/2003 | Bowers et al. | |
| 2004/0010586 A1 * | 1/2004 | Burton et al. | 709/224 |
| 2004/0092266 A1 * | 5/2004 | Olrik | 455/445 |
| 2005/0185579 A1 * | 8/2005 | Jung | 370/229 |
| 2005/0186939 A1 * | 8/2005 | Barnea et al. | 455/405 |
| 2005/0258806 A1 * | 11/2005 | Janik et al. | 320/155 |
| 2006/0036893 A1 | 2/2006 | Anglin et al. | |
| 2006/0230306 A1 * | 10/2006 | Richards et al. | 714/7 |
| 2007/0014243 A1 * | 1/2007 | Meyer et al. | 370/249 |

FOREIGN PATENT DOCUMENTS

| | | |
|---|---|---|
| FR | 2872077 | 12/2005 |
| GB | 611873 | 6/1947 |

OTHER PUBLICATIONS

European Patent Application No. 06 123 406.8 European Examination Report of dated Sep. 29, 2010.

* cited by examiner

SYSTEM FOR CORRECTING ERRORS IN RADIO COMMUNICATION, RESPONSIVE TO ERROR FREQUENCY

The technology as described herein relates mainly to communication stations that communicate with each other by radio transmission, through a GSM network, or server, where one (or both) stations is, or includes, a battery-powered personal digital assistant (PDA), such as the BLACKBERRY® mobile data device.

The technology as described herein can be most advantageously applied when one (or both) of the communicating stations is a battery-powered portable device. Portable or hand-held mobile devices are typically very restricted as to the amount of memory that can be provided on the device, and also as to the battery life that can be provided. The design emphasis is to save on-device resources for transmitting useful information. Another design emphasis is to minimise transmission time (which must be paid for by subscription to a PLMN or other service operator.) It is recognised that it is all too common a problem that transmission time, and battery power, are wasted, because of an uncorrected error.

Even if power supply and data storage are not restricted, when two stations are communicating through a server, it still is advantageously economical to utilise transmission time efficiently, whereby the systems as described herein are generally applicable. The systems are aimed at efficiently dealing with errors, and particular with certain kinds of troublesome and costly errors.

The systems as described herein are mainly concerned with the kinds of errors that arise typically in a mobile battery-powered device, or mobile-station, and can be detected on the device. That is to say, the errors can be detected by routines programmed into the device. The systems as described herein, however, are not concerned with errors that can be corrected at the device or station level. Rather, the invention is concerned with errors that arise in, and are detected in, the mobile-station, but which can be best corrected by the server (with its much greater resources), or by the server and the mobile-station together.

It is recognised that many of the transmission problems arise because of errors in the communicating stations in which the data items are composed, and especially errors that arise in the networks associated with the communicating stations. On-station facilities can sometimes correct these errors, but data packets containing errors often are transmitted.

Knowing that the errors often do correct themselves, a traditional or conventional server, upon detecting a communication error in a data packet, usually is programmed simply to issue an instruction to the appropriate station to re-send the offending data packet. That is to say, when the server detects that an incoming data packet contains an error, usually the only response required of the server has been simply to instruct the station to re-send the data packet.

Indeed, it has not traditionally been regarded as one of the server's responsibilities, to take an active part in diagnosing and correcting errors that arise in the communicating stations, beyond instructing the station to repeat the data packet or datagram. Rather, if the errors cannot be corrected by such simple means, the matter has been regarded as the responsibility of the (designers of the) stations.

A difficulty that can arise with certain kinds of errors, when the error does not correct itself, is that the communication transmission system, including the server, becomes bogged down by the server repeatedly instructing the station to re-send the data packet, or by the server repeatedly carrying out some corrective routine, such as a sync-check, which is not actually correcting the problem.

In many cases, eventually the (human) user at one of the stations will complain to the server about the delays and poor performance. Now, the engineer at the server can know that there is a problem caused by an error at the station. The problem arises that the engineer is unable to correct the error due to lack of information. Often, by the time the user at the station contacts the engineer, the error is no longer present, and information relating to the error is no longer available, on the station.

It is recognised that many of these troublesome errors can be addressed automatically, and very efficiently, by a rather simple change in operating procedure at the server. Indeed, it is recognised that many of what have been the most troublesome and frustrating errors can, upon implementing the systems as described herein, be corrected invisibly, i.e without the human users of the stations being aware that any problem had even arisen.

The systems as described herein are aimed at correcting errors in radio transmissions between a mobile station and a server. The station keeps a record, termed a recent-activity-log, in memory at the station, of the procedural elements as followed by the station when making a transmission. Preferably, the server monitors transmissions from the station, checking each transmission for the presence of an error-signal. Preferably, if/when an error-signal is detected by the server, the server responds by incrementing an error-events-counter in the server. Preferably, if/when the error-count reaches a pre-determined threshold, and subsequently a further error-signal is detected by the server, the server issues a send-log-signal to the station, being a signal that instructs the station to transmit the recent-activity-log to the server. Preferably, upon receiving the recent-activity-log, the server determines whether it can, with the aid of the recent-activity-log, formulate a strategy for correcting the error, and then does so.

DETAILED DESCRIPTION OF PREFERRED EMBODIMENTS

By way of further explanation, exemplary embodiments will now be described with reference to the accompanying drawings, in which.

The systems shown in the accompanying drawings and described below are examples. It should be noted that the scope of protection sought is defined by the accompanying claims, and not necessarily by specific features of exemplary embodiments.

Figure 1:
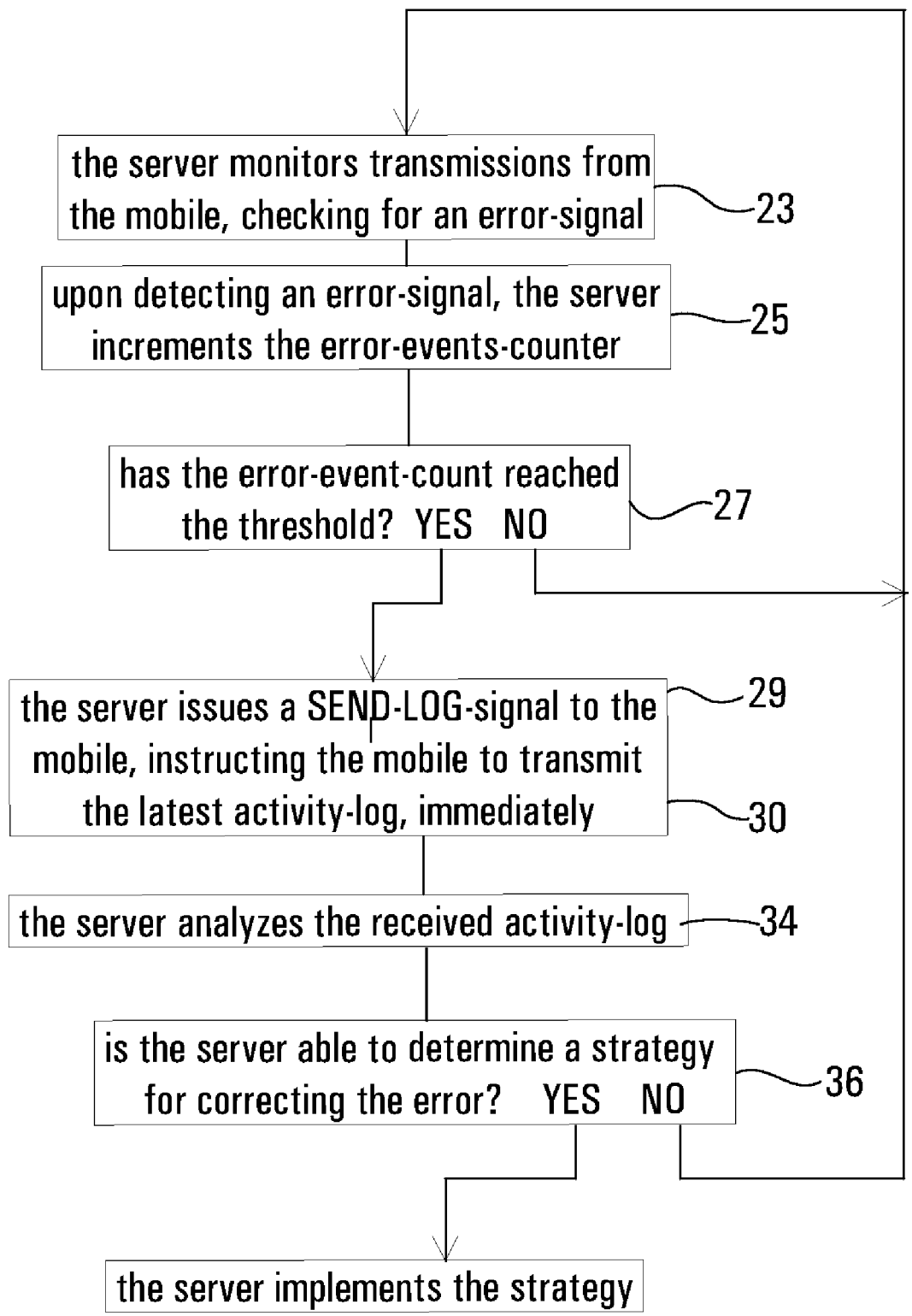
FIG. 1 is a diagram illustrating a programmed system to be followed by a server.

The diagram of FIG. 1 represents the programmed system followed by the server that is handling a communication between two stations.

Station S1 is an office-based computer, powered by mains-electricity, which typically is on a local wired or wireless local office network. Station S2 is remote, and mobile, and in the particular example is a BLACKBERRY® personal digital assistant, which is connected to the office network by a radio link. The stations subscribe to the server. The server is a particular Personal Communications Service (PLMN) operator, using a radio link operating under the GSM (Global System for Mobile Communications).

The communicated information may be of many different types. The errors with which the systems as described herein are concerned, are typically of the kind that arise when the data packets are communicating updates to databases, and when the error causes the databases in the stations to become out of synchrony. However, other types of errors also can benefit from implementing the error-correcting system as described herein.

In the example depicted in FIG. 1, the remote- or mobile-station is communicating with the server, i.e is transmitting packets of data to a base-station, via the server. In the example, the data comprises updates to a database. The base-station version of the database has to be in synchrony with the mobile-station version of that particular database, prior to the transmission of update information.

In programmed procedure 23, the server is monitoring the data packets coming in from the mobile station, checking for the presence of an error-signal. If the server detects an error-signal, the server increments (procedure 25) the appropriate error-event-counter. (The server might be tracking several different kinds of errors A, B, C, each with its own error-event-counter.)

The kind of error the server is concerned with is the kind that can be ignored if it happens only once, or only a few times. If the error occurs once and then goes away, that indicates that the error has been picked up, and corrected, automatically.

In procedure 27, the event count has reached the pre-determined threshold for that particular error.

Generally, this threshold will not be an absolute count, but rather will be a count per unit of time, or error-frequency. The counter, in the server, can be programmed to re-set itself, or to reduce the count, automatically, if no further errors have been received in a period of time, as determined by an algorithm in the server. The algorithm can be simple or complex, as the designer of the server might specify, and might be different for each type of error. The algorithm may include a facility whereby, if the number of errors per unit of time should wane, the counter will re-set, on the grounds that the fact of waning indicates that the error has sorted itself out.

In procedures 29,30, the count of error-signals received from the mobile-station having exceeded the threshold, now the server issues a send-log-signal to the mobile-station. The send-log-signal instructs the mobile-station to transmit, preferably immediately, the recordings, as currently stored in the mobile station, of the details of the procedural elements as carried out in the station, relating to (and just preceding) the assembly of the data packet and to its manner of transmission to the server.

This information is required by the server in order to enable the server to isolate and diagnose the error problem—and, of course, to correct the problem if possible. It may be regarded that the information recorded in the mobile-station, as desired by the server, is information that will aid de-bugging generally. For present purposes, the recordings of the procedural elements performed on/at the mobile-station is referred to as the recent-activity-log.

Insofar as the designer can select what types of information will be recorded, the information that preferably should be recorded is all information that might potentially help the server (or the engineer at the server) to diagnose and correct the error. However, it is in many cases not possible to select or choose just what information is recorded on/by the mobile-device. Mobile devices may be programmed to record all procedural elements of a certain type, and to not record any of the elements of other types. However, as will be explained, some mobile devices do have the facility (referred to herein as a log-switch) of enabling a change to be made in the level of detail (i.e in the number of types of procedural elements) that is recorded in the recent-activity-log in the device.

The recordings stored in the recent-activity-log include information relating to the transmission itself, but relating also e.g to local network activity that might have taken place just before transmission, or e.g to steps of some unrelated program that might have been executed on the mobile device just before transmission, and so on.

Naturally, the more data that is recorded, the more memory and transmission time is required to transmit it. Often, in many types of mobile device, on-device memory is at a high premium, and the recent-activity-log can be stored in on-device memory only for a short time.

Usually, the recent-activity-log is configured as a block of memory, in the device, in which the recordings of the procedural elements are stored in sequential order. The device can detect when the log is full, and can overwrite older stored recordings with incoming new recordings, on a first-in-first-out basis.

Thus, it is important, in order for the server to be able to benefit from the information, for the mobile device to transmit the recent-activity-log more or less immediately, i.e before the information recorded in the log can be over-written. Of course, the manner of arranging, and the contents of, the recent-activity-log vary a good deal with the different makes of mobile device, but the recent-activity-log can be regarded basically as one single composite record, in which the information keeps on being replaced.

Another reason why the server requires the recent-activity-log to be transmitted immediately is that the connection between the server and the mobile station might shortly be broken, as the station is switched off-line. In the case where the device remains on-line, still the recent-activity-log preferably should be transmitted immediately, and the error corrected; it is a drain on the battery, and other resources, for the server to initiate the repeat-send instructions, to perform sync-checks, and to take other error correction measures, and to carry on doing so, over and over, if the error is not being corrected.

The block of memory provided on a mobile-device, for storing the recent-activity-log, typically is good for recording, say, two hours of activity time (over e.g several days of real time). Some kinds of mobile devices (e.g the BLACK-BERRY®) are able to be programmed to record the activity log at different levels of detail. At a high level of detail, the log would be good for recording, say, one hour of activity time.

Having issued the instruction, the server now waits for the desired recent-activity-log to be received from the mobile device. If the log has not been received within a short waiting-period, or before the mobile device goes off-line, the server starts again with procedure 23—without re-setting the counter, of course. Then, the next time the mobile device is on-line, and an error event is detected, the event count is still (in fact, is now further) above the threshold, and so the server again sends the send-log-signal to the mobile device to transmit the latest recent-activity-log.

Once the server has received the recent-activity-log, in procedures 34,36, the server now analyses the information, and determines whether it has enough information to determine a strategy for correcting the error. If not, the server returns to procedure 23 (again without re-setting the counter). The intent is that enough information will be forthcoming, either on a simple accumulation basis, or because one of the transmitted logs finally does pin-point the actual error, to enable diagnosis and correction. Indeed, the systems as described herein are intended to be used mainly in respect of errors about which this is true. That is to say, the systems as described herein can hardly be regarded as beneficial in the case of errors of a type that still cannot be diagnosed or resolved even after large quantities of procedural records have been received from the mobile device.

Also, the systems as described have little benefit in the case of errors that can be dealt with by the error-correction systems at the mobile-station or base-station, nor in the case of errors that can be dealt with by the server without the assistance of the activity-log data from the stations.

Once the information in the recent-activity-log is sufficient, or once the information from the accumulated logs is sufficient, the server then diagnoses and corrects the problem. After that, the server reverts to procedure 23, this time after re-setting the counter.

In fact, the designer might prefer not to re-set the counter following an implementation of an error-correcting strategy. Where the server has been programmed to reset the counter in response to the errors petering out, then the counter will automatically re-set itself if the error has indeed been corrected. If it turns out that the error has not been corrected, it is preferred that the programmed procedure should continue anyway.

The scope of the words "correcting the problem" should be widely construed. Depending on the type of error, it might only be possible for the server to diagnose the problem, while an action that cannot be performed directly by the server is needed to finally resolve the problem. For example, the server might diagnose a hardware problem on the mobile device, and this diagnosis can be communicated to the (human) user by means of e.g an automatic text message, to the effect that the user needs to take the device in for repair. Thus, the described systems can be advantageous even when "correcting" amounts to the server merely diagnosing the problem, and communicating the diagnosis to the device. Sometimes, all the server is able to do is to confirm that there is nothing wrong with the transmission of the data, and therefore the problem must lie elsewhere. This can be a valuable step on the way towards a final resolution of the problem.

However, usually, the kind of errors with which the systems as disclosed herein are mainly concerned are the kind that can be corrected by the server. This is especially true of errors of the kind that lead to the databases in the communicating stations being out of synchrony, in that the server can initiate sync-checks, and the server itself can initiate and perform procedures to get the stations back in synchrony. Also, recurrent errors of mis-formatting can be corrected, once an examination of the recent-activity-log has pinpointed the fault. Hardware problems on mobile devices sometimes give rise to the kind of oft-recurring error that can be beneficially addressed by the systems as described herein.

The operations performed by the server can be more or less sophisticated. That is to say, the server can be programmed to diagnose and deal with the error problems fully automatically, each type of error dealt with its in own unique way, and/or the server can be programmed to require interaction with a human administrator, who might initiate contact with the (human) user of the mobile station, if that seems to be useful as a way of correcting the problem. There is, generally, little practical limit to the diagnostic and curative programming sophistication that can be provided at the server—which may be contrasted with the mobile station where, of course, diagnostic resources are at a tight premium. Preferably, it should be an aim of the designer that little, or nothing at all, is required on the mobile device, by way of extra software, or extra hardware, or other special provisions for implementing the technologies as described herein.

Figure 2:
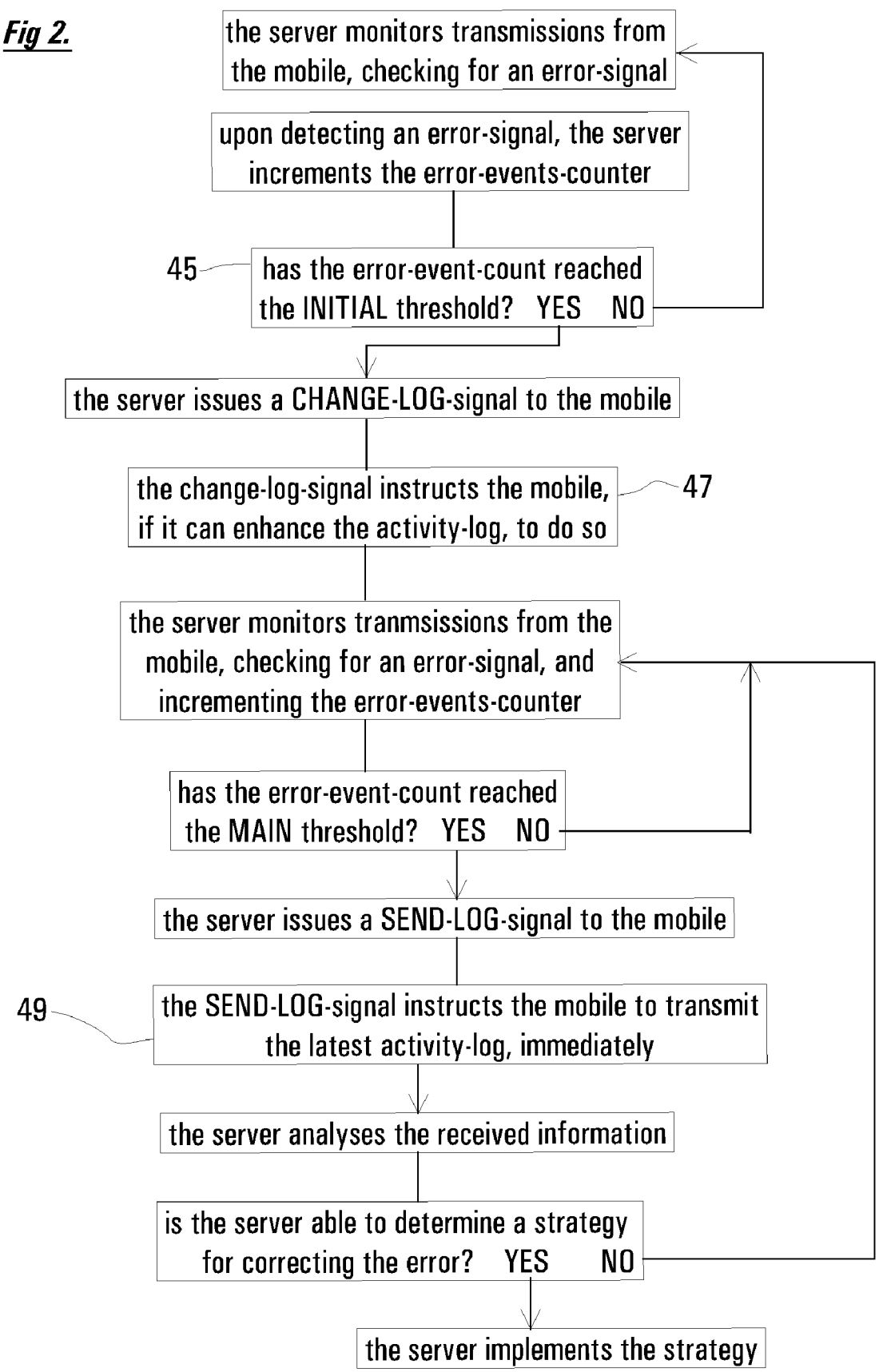
FIG. 2 illustrates another programmed system to be followed by a server.

FIG. 2 shows a refinement that can be useful when the mobile device is sophisticated enough to be capable of responding to a change-log-signal from the server, instructing the mobile device to enhance the level of recording that goes into the recent-activity-log. (Some versions of) the BLACK-BERRY® PDA, for example, can be so instructed.

In this case, if the error event count exceeds a preliminary or initial threshold (procedure 45), the server instructs the mobile device (procedure 47) to step up or enhance its recent-activity-log recordings—for example, as to level of detail retained in the recordings, and/or the logging duration period. The level of detail can be e.g stepped through: (a) basic; (b) information retrieval; (c) de-bugging; and so on. Of course, the more detailed the recording, and/or the further back the activities that are recorded, the greater the amount of high-premium on-device memory that is needed.

The systems as described are advantageous when the recent-activity-log as recorded on the mobile device is switchable between at least two states, being a normal-state and an enhanced-state. Basically, in the normal-state, the recent-activity-log is set to record activities on the mobile-station at a comparatively low level of detail, while in the enhanced-state, the recent-activity-log is set to record activities on the mobile-station at a comparatively high level of detail.

Alternatively, or additionally, the mobile device includes the facility to enter an enhanced-state in which an extra block of memory is set aside within the mobile device for the recent-activity-log (perhaps at some penalty as regards other functions). Alternatively, or additionally, in the enhanced-state, the extra memory is simply used to record activities at the same level for a longer period of time.

The remote-station includes a log-switch, for changing the state of the recent-activity-log from normal-state to enhanced-state (and back). The log-switch is operable responsively to receiving a change-log-signal from the server. (The log-switch may also be operable in other ways, e.g manually by the user.)

Thus, in the interim between the initial threshold and the main threshold, the mobile station is recording (but not yet transmitting) the enhanced recent-activity-log. Then, when the main threshold is reached (procedure 49), the server now instructs the mobile device to send the latest log. Again, after analysis of the log recordings, the server might determine that a further log is required, and if so, that can be requested next time the error event occurs.

Again, if, at any time, the number or frequency of error events should die away, the server may be programmed to assume, after a time, that the error has corrected itself, and then to re-set the threshold counters to zero and the log-switch back to normal.

In the mode of operation as shown in FIG. 2, it is not necessary that all the stations connected to the server be sophisticated enough to respond to the call to enhance the recent-activity-log. An unsophisticated station simply ignores the initial threshold, but will send its (not enhanced) recent-activity-log after the error count passes the main threshold, in the manner as described with reference to FIG. 1. In other words, each station only responds to the call to enhance the recent-activity-log if it is capable of doing so.

In both FIG. 1 and FIG. 2, the server preferably is programmed to detect the case where, after the server has instructed the mobile device to send its recent-activity-log, and the mobile device either does not do so after repeated requests, or does so repeatedly but the information in the several now-received logs still is not enough to correct the problem. Preferably, the server should not just go on and on, endlessly seeking information which apparently will not be forthcoming. If that were permitted, even the other communications between the server and the mobile device, i.e the communications in which no error event occurs, would or might become bogged down due to procedures for dealing with the uncorrected error—which the systems as described herein are intended to alleviate.

The server preferably is programmed, upon detecting that the error cannot be corrected, to send e.g a text message to the subscriber at the mobile station, to the effect that an error has been detected, which cannot be corrected automatically. The message may be supplemented by appropriate further instructions to fit the particular case.

Examples of some of the types of errors that can be addressed by the present systems will now be considered.

The systems as described herein are advantageous when the errors are of the kind that lead to a waste of battery energy on the mobile device, whereby the battery drains prematurely: or are of the kind that lead to wasted transmission time—which has to be paid for, and which also drain the battery prematurely.

Error-caused ineffectual transmissions from the mobile station lead to premature battery drainage, and waste (expensive) transmission time. It is recognised that the fact that the transmissions are indeed ineffectual is often much more readily detected on/by the mobile station than by the server.

Error-caused ineffectual searching (on standby) for a PLMN network that cannot be found also leads to premature battery draining, and wastes transmission time.

In many cases, it is not that the server is unable to detect these errors at all. Rather, the usual problem is that the server has to waste transmission time in order to detect the fact that what was occurring was an error. But when the errors are of the kind that lead to wasteful usage of battery power and transmission time, it is recognised that that fact is much more easily diagnosed on/by the mobile device—i.e more easily in the sense that the diagnosis can be done without needing extra transmissions to take place between the server and the mobile device. Thus, the fact that an on-board error is causing energy to be drawn from the on-board battery at too high a rate can easily and efficiently be detected by on-board trigger and diagnostic routines.

It is preferred, for these reasons, that the error-signals with which the systems as described herein are concerned come from the mobile device, rather than from the server. The error-signals are then received by the server, and appropriate error correction systems are carried out by, or at least controlled by, the server. Of course, the fact that the error-signals with which the systems as described herein are concerned come from the mobile-device does not preclude the possibility that other error detection systems may be provided, which do respond to errors detected on/by the server.

Common kinds of errors that lead to premature battery drainage on mobile devices include synchrony errors, which lead to slow-sync episodes, and various other errors such as packet formatting and protocol errors, which may be categorised as database mismatch errors.

Typically, the errors of present interest are errors that have the effect of placing a database in the base-station out of synchrony with the corresponding version of the database in the mobile-station. As mentioned, traditionally and conventionally the matter has been corrected by a simple re-send of the offending datagram; but the concern here is with those cases where that simple procedure does not correct the problem.

Of course, if an error lies in the data itself—through having been mis-typed, for example—there is not much that can be done about that. Such errors can (sometimes) be detected by e.g double-entry detection systems; but these are not likely to be the kind of errors that are conveniently dealt with by implementing the present system. Entry-errors tend to be single events, which are corrected (if they are corrected at all) on a one-time basis, whereas the present systems are aimed at errors that are not significant if they occur just once, but which become troublesome when they recur repeatedly. (An inept (human) operator might make many data-entry mistakes, but that would be a case of many separate errors, each of which requires its own detection, and its own correction, whereas the present system is more concerned with repeated occurrences of the same error.)

EXAMPLE 1

Packet Formatting and Protocol Errors

Here, the base-station and the mobile-station databases become out of synchrony because the formatting of, i.e the protocol for assembling, the datagram, has not been (or appears not to have been) performed in the manner as needed for the data-packets to be properly recognised by the other station. Often, this type of error might be due e.g to a momentary interruption of transmission, and it can indeed be corrected by a simple re-send. The present system is intended to be available for diagnosing and correcting this kind of error, when it becomes frequent, i.e when it is not be corrected by a simple re-send.

EXAMPLE 2

Type-of-Data Inconsistency

Here, the mobile-station and base-station versions of the database, and the sync-anchors stored at the server, become out of synchrony because an item of data detectably does not fit into the data-field to which it appears to have been assigned, or the items seem to have been assembled in a detectably-wrong order. Again, these errors might be short-lived, in that they might be corrected by the database programs at the stations. The present system is intended to be available for diagnosing and correcting this kind of error, when it persists (i.e is repeated) over a period of time.

When the database versions in the communicating stations do become out of synchrony, and the server recognises this fact, what might happen is that the server imposes a slow-sync mode onto the communications between the stations. Now, not only is the individual data packet repeated, but the synchronisation process is also individually repeated, at a slower speed. While the occasional slow-sync is to be expected, and is not significant, repeated slow-sync events can be very wasteful of transmission time, and of on-device resources.

It may be regarded that the more slow-sync events that occur, within a given time frame, the greater the need for the systems as described herein. However, implementing the described systems may be done to address errors other than those that lead to slow-sync episodes. But slow-sync errors do typify the kind of operations that quickly over-use and deplete resources, if they happen too frequently, and yet which can (usually) be addressed automatically by the systems described herein.

There can be many reasons, in detail, as to why an error leads to a slow-sync procedure. In diagnosing the problem, the server needs the assistance of the recent-activity-log or logs, as derived, immediately, from the error event itself. A complete and detailed recent-activity-log often enables the server to zero in on the information needed to de-bug the offending transmission.

A typical example of a repeated-slow-sync problem, and the manner in which the present technology assists in its solution, will now be described in more detail.

The example is termed an invalid-sync-state error. The error occurs during transmission of a datagram, between e.g the base-station and the mobile-station, through the server.

Considering a particular database: there are two versions thereof, one in the base-station and the other in the mobile-station. The base version should be in synchrony with the mobile version of the same database. In this case, what this means is that sync-anchors stored in the server will match, if all is well, the corresponding sync-anchors of the mobile and base versions of the database.

During a transmission of a datagram from the base-station to the mobile-station, the sync-protocol between the server and the base-station, and between the server and the mobile-station, makes use of the sync-anchors. The stations, or the server, may issue sync requests, in which the server checks whether the sync-anchors of the base-station and the mobile versions of the database match those of the server.

Having detected the invalid-data-sync error, the mobile station signals the error to the server. The server (having first carried out the usual verification checks) then triggers the slow-sync procedure, and increments the error-event-counter.

The slow-sync-procedure is usually effective, eventually, to re-synchronise the two versions of the database. However, the procedure is wasteful of resources, including CPU, memory, battery power, OTA traffic, etc. Also, the procedure occupies (i.e wastes) communication time between the stations.

However, the purpose and function of the slow-sync procedure is to enabled synchrony to be restored between the versions of database stored in the mobile-station and in the base-station, and hence between the sync-anchors stored in the server.

If an invalid-sync-state error event happens just once, or happens only very occasionally, the slow-sync-procedure carries out the function for which it was designed, and restores synchrony. This wastes resources and time, but then that is the end of it. But if the invalid-sync-state error keeps on occurring repeatedly, now the wastage of resources and time can become very significant. Thus, the invalid-sync-state error is typical of the type of error that can benefit from the systems of the kind as described herein.

Traditionally, when an invalid-sync-state error event was detected, the system would simply initiate the slow-sync-procedure, and would carry on initiating the procedure, over and over, each time the error was repeated. This repetition could be detected by the server, and of course certain diagnostic procedures could be done automatically, either in the server or in the stations, but in the end, often, a (human) engineer (at the server) would have to take steps to find out the cause. However, as described, it was all too often the case that there was not enough information available at the server, especially information from the mobile station, for a proper diagnosis, and the error would keep on repeating until finally the error did become apparent.

When the systems as described herein are implemented, by contrast, now it is the fact of the repetition of the error that (automatically) triggers the server to issue the send-log-signal to the mobile-station (and/or to the base-station), to send or re-send the recent-activity-log. Thus, transmission resources are not wasted in constantly sending redundant logs, and yet the logs are indeed sent at the times when the chance is high that the information they contain will be useful.

In the example being described, the two-stage procedure as described in relation to FIG. 2 makes for a very efficient implementation. Thus, at the first invalid-sync-state error event, the server initiates (as it does in the traditional systems) the slow-sync-procedure. If the procedure works, and synchrony is restored, the server does nothing more (apart from incrementing the invalid-sync-state-error-event counter). But now, if more invalid-sync-state error events occur beyond the initial threshold, now the server sends a change-log-signal to the mobile-station (and/or to the base-station) to enhance the level at which transmissions are logged. At the same time, the server initiates the slow-sync-procedure, and again increments the error-event-counter.

The threshold number of errors that must be counted before the change-log-signal is triggered is pre-determined. One of the benefits of having the error correction procedure carried out on/by the server is that it is a simple matter for the threshold to be changed, if that should become desirable, on the server—simple, that is to say, when compared with the task of changing the threshold on (all) the mobile devices.

The same applies to changing the remediation procedures themselves, as well as to changing the thresholds. The server has the resources to react to, and investigate, the problem. But the server can only do this efficiently if it has the enhanced activity-log. The server is also in a position to change or update the remediation procedures, if that should be seen to be desirable.

Further invalid-sync-state error events can be used by the server to trigger a signal to the station(s) to be ready to transmit the enhanced-level logs. Again the server initiates the slow-sync-procedure, and again increments the error-event-counter.

A further invalid-sync-state error event, beyond the main-threshold, is used by the server to trigger the issue of a send-log-signal to the mobile station, instructing the station now to actually commence transmitting the enhanced-level activity-logs to the server. These logs are then packaged and stored at the server, ready to serve as aids in the investigation and diagnosis. The designer might prefer to have the server disable or break off the attempted transmission of data packets between the stations, at this time, while the diagnosis and remediation exercise is being carried out.

The designer can program the server such that, if repetitions of the error do not occur within the pre-determined time periods, the server arranges for the error-event-counter to be reset, or set back, depending on what the designer may judge to be most efficient.

Again, errors of the slow sync type are not significant if they occur say once every few hours (of transmission time). But they are significant if they occur once every few minutes. This kind of difference—between significant and not significant—is often very marked, so that the thresholds can be set quite coarsely in most cases.

A station, as that term is used in this specification, is an entity that can send communications (especially radio communications) to, and/or receive communications from, a server. The station might, in some cases, be a single computer, or a single cellphone, or similar device. In other cases, the station might be a local-area-network covering several computers. Generally, the stations may be regarded as the individual subscribers to the server, i.e as the individual users of the communication facility offered by the server.

The server comprises the PLMN on the GSM network to which the stations subscribe. The server, as the term is used herein, in fact refers mainly to the error detection and repair aspect of the network facility. In some networks, the error detection and repair function is passed (e.g by a radio link) to e.g an outside specialist, and in that case the specialist would be included within the scope of the term "server".

Each station includes a number of devices. (The number can be one.) A device, as that term is used herein, includes a fixed computer, which is powered by mains electricity, and is networked with other computers, either by hard wires or wirelessly. A mobile device, as that term is used herein, includes a laptop computer, and includes a PDA, a cell phone, and similar (and dissimilar) products that are battery-powered and are capable of radio communication with servers. Such a mobile device is often not connected into a local network, and may equally be termed a mobile station.

It is recognised that the error detection and correction arrangements as described herein are particularly advantageous when applied to radio communications, because of the commercial reality of the on-going (and large) expense attributable directly and proportionately to the time actually spent in occupation of the radio communication channel.

Thus, a major feature of the described systems is that the mobile-station sends the error-signals to the server, whereupon the server increments a counter (at the server). Then, at the count threshold, the server issues the send-log-signal, instructing the mobile-station to send its current recent-activity-log. This system may be contrasted with systems (e.g as shown in patent publication US-2003/0005107) in which the server issues the send-log-signal to the stations, but not on the basis of having received and surpassed a threshold of error-signals from the station; rather, in such systems, the designer has arranged that the server polls each station from time to time. This is very wasteful of premium transmission time. Furthermore, such systems are not able to sense whether to poll a particular station at a higher frequency than the others. Therefore, the kinds of errors that are addressed by the systems as described herein, where the frequency of repetition of the errors is important, would simply never be detected by (infrequent) polling. To detect those errors—which are troublesome only when they occur frequently—polling would have to take place more frequently than the errors, which would be very wasteful indeed.

The invention claimed is:

1. A system for correcting errors in a mobile station connected to a network, the system comprising:
    a server configured to connect to the mobile station via the network;
    the server further configured to receive an A-error-signal from the mobile station, the A-error-signal indicating that an error of a type A occurring in the mobile station has been detected at the mobile station;
    the server comprising:
        an A-error-events-counter configured to keep a count, termed an A-error-events-count, of A-error-signals received from the mobile-station;
    the server further configured, responsive to the A-error-events-count reaching a main-threshold, and upon receiving a further A-error-signal, to send a send-log-signal for causing the mobile-station to transmit to the server a recent-activity-log containing records of recent activities taking place in the mobile-station;
    the server further configured, responsive to receiving and analyzing the recent-activity-log, to make a determination as to whether the server can formulate a strategy for correcting the error; and
    the server further configured, responsive to the determination being affirmative, to carry out the strategy.

2. The system of claim 1, wherein the server is a PLMN communication service operator.

3. The system of claim 1, wherein the server is further configured to relate the A-error-events-count to time, the number of A-errors detected within a pre-determined time period being termed A-error-frequency; and
    the server further configured to vary the threshold in accord with the A-error-frequency, in the sense of increasing the threshold as and when the A-error-frequency reduces.

4. The system of claim 1, wherein the server is further configured, upon receiving and analyzing the recordings, and upon making a determination that the server cannot, even with the aid of the recordings, formulate a strategy for correcting the error, to make a server-copy of the recordings of the recent-activity-log, and to store same in the server;
    the server further configured to monitor transmissions from the mobile-station, for errors;
    the server further configured, upon detecting a further A-error-signal, to issue a further send-log-signal requesting transmission of the later-recordings; and
    the server further configured, responsive to receiving and analyzing the said later-recordings, to make a determination whether the server can, with the aid of the recordings and the later-recordings, formulate a strategy for correcting the error; and responsive to such determination being affirmative, to carry out the strategy.

5. The system of claim 1, the server further comprising a sync-anchors;
    wherein the A-error-signal indicates a lack of synchrony between the sync-anchors and a corresponding database-mobile at the mobile station; and
    wherein the strategy includes a procedure initiated by the server for remediating the said lack of synchrony.

6. The system of claim 1, wherein the server is further configured to detect the A-error-events-count reaching a initial-threshold, which is lower than the main-threshold; and
    the server further configured, responsive to the A-error-events-count surpassing the initial-threshold, to send a change-log-signal for causing the mobile-station to operate a log-switch and thereby generate an enhanced recent-activity-log.

7. The system of claim 1, wherein the server is further configured to receive a B-error-signal from the mobile station, the B-error-signal indicating that an error of a type B occurring in the mobile-station has been detected at the mobile-station;
    the server further comprising:
        a B-error-events-counter, which is effective to keep a count, termed a B-error-events-count, of B-error-signals received from the mobile-station;
    the server further configured, responsive to the B-error-events-count reaching a main-threshold, and upon receiving a further B-error-signal, to send the send-log-signal;
    the server further configured, responsive to receiving and analyzing the recent-activity-log, to make a determination whether the server can formulate a strategy for correcting the error; and
    the server further configured, responsive to such determination being affirmative, to carry out the strategy.

8. A method of correcting errors, for use between a server and a mobile-station, where the server and the mobile-station are connected by a network radio link, characterized by the following combination of features:
    receiving, at the server, an A-error-signal indicating that an error of a type A occurring in the mobile station has been detected at the mobile station;

keeping a count at the server, termed an A-error-events-count, of A-error-signals received from the mobile station;

responsive to the A-error-events-count reaching a main-threshold, receiving a further A-error-signal;

responsive to receiving a further A-error-signal, sending a send-log-signal for causing the mobile-station to transmit to the server a recent-activity-log containing records of recent activities taking place in the mobile-station;

receiving and analyzing the recent-activity-log at the server;

making a determination whether the server can formulate a strategy for correcting the error; and responsive to such determination being affirmative, carrying out the strategy.

9. A mobile station for use in an error correction system, the mobile station comprising:

an A-error-detector, for detecting an error of a type A, termed an A-error, occurring in the mobile station;

an operable A-signaler which is operable in response to an A-error being detected by the A-error-detector, and which is effective, when operated, to send an A-error-signal to a server for keeping a count of A-error-signals; and a recent-activity-log, which records recent activities taking place in the mobile station;

the mobile station being effective, upon receiving a send-log-signal from the server responsive to the count of A-error-signals reaching a threshold, to transmit the recordings stored in the recent-activity-log.

10. The mobile station of claim 9, wherein the mobile station comprises a mobile device, which is portable and battery-powered.

11. The mobile station of claim 9, wherein the mobile station is configured to transmit the recordings stored in the recent-activity-log immediately upon receiving the send-log-signal.

12. The mobile station of claim 9, wherein the mobile station is programmed to store the recordings in the recent-activity-log in sequential order; to detect whether the recent-activity-log is full; and responsive to the recent-activity-log being full, to overwrite older stored recordings with incoming new recordings, on a first-in-first-out basis.

13. The mobile station of claim 9, further comprising a database stored in the mobile station;

the A-error-detector configured to detect a lack of synchrony between the database and a sync-anchor stored at the server;

the A-signaler operable to send an A-error-signal responsive to such detection.

14. The mobile station of claim 10, wherein the A-error-detector is configured to detect when energy is being drawn from the battery at more than a predetermined rate; and the A-signaler operable to send an A-error-signal responsive to such detection.

15. The mobile station of claim 9, wherein the recent-activity-log is switchable between a normal-state in which the recent-activity-log is set to record activities on the mobile station at a normal level, and an enhanced-state in which the recent-activity-log is set to record activities on the mobile station at an enhanced level;

wherein the mobile station includes an operable log-switch, which is effective, when operated, to change the state of the recent-activity-log from normal-state to enhanced-state; and wherein the log-switch is operable in response to receiving a change-log-signal from the server.

16. The mobile station of claim 9, further comprising:

a B-error-detector, for detecting an error of a type B, termed a B-error, occurring in the mobile station;

an operable B-signaler which is operable in response to a B-error being detected by the B-error-detector, and which is effective, when operated, to send a B-error-signal to the server.

17. A method of correcting errors in a communications system, the method comprising:

detecting, at the mobile station, an error of a type A, termed an A-error, occurring in the mobile station;

responsive to detecting the A-error, sending an A-error-signal from an A-signaler of the mobile station to a server for keeping a count of A-error-signals;

responsive to receiving a send-log-signal at the mobile station from the server responsive to the count of A-error-signals reaching a threshold, transmitting recordings stored in a recent-activity-log to the server for making a determination whether the server can formulate a strategy for correcting the error, the recent-activity-log containing a record of recent activities taking place in the mobile station.

* * * * *